United States Patent
Choi et al.

(10) Patent No.: US 6,285,408 B1
(45) Date of Patent: Sep. 4, 2001

(54) DIGITAL AUDIO/VIDEO SYSTEM AND METHOD INTEGRATES THE OPERATIONS OF SEVERAL DIGITAL DEVICES INTO ONE SIMPLIFIED SYSTEM

(75) Inventors: Seung-Jong Choi, Seoul; Jin-Kyeong Kim, Kyungki-do; Hwa-Young Lyu, Seoul, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/288,076

(22) Filed: Apr. 8, 1999

(30) Foreign Application Priority Data

Apr. 9, 1998 (KR) ................................................. 98-12612

(51) Int. Cl.[7] ...................................................... H04N 5/46
(52) U.S. Cl. ............................ 348/555; 348/554; 348/565
(58) Field of Search ..................................... 348/554, 555, 348/556, 563, 564, 565; H04N 5/46, 5/445, 5/45, 3/27

(56) References Cited

U.S. PATENT DOCUMENTS 5,463,619    10/1995    van Steenbrugge et al. .
5,973,748  * 10/1999    Horiguchi ............................ 348/554
6,005,640  * 12/1999    Strolle ................................. 348/555

OTHER PUBLICATIONS

IEEE Computer Society, "IEEE Standard for a High Performance Serial Bus", http://www.1394ta.org/Technology/Specifications.

* cited by examiner

Primary Examiner—Sherrie Hsia (57) ABSTRACT

A digital audio/video system and method is disclosed. The digital audio/video system of the present invention integrates the operations of several digital devices into one simplified system by eliminating duplicative elements required in each digital device. The combination of operations allowed by the digital audio/video system and device generally includes simultaneously viewing two TV programs, viewing one TV program while recording the other TV program, simultaneously viewing two TV programs while recording one program, viewing one TV program and another program received from a storage device such as a video tape or a DVD disc, or viewing two programs received from a storage device.

16 Claims, 6 Drawing Sheets

DIGITAL AUDIO/VIDEO SYSTEM AND METHOD INTEGRATES THE OPERATIONS OF SEVERAL DIGITAL DEVICES INTO ONE SIMPLIFIED SYSTEM

BACKGROUND OF THE INVENTION

1. Field of the Invention

The present invention relates to a digital Audio/Video (A/V) system, and more particularly to a digital A/V system and method which can support digital systems including digital TV (DTV), digital VCR (DVCR), and digital versatile disk (DVD) player.

2. Background of the Invention

An A/V system is generally an integration of appliances such as TV, VCR and audio system for the purpose of storing and reproducing a variety of media. Currently, the A/V system primarily supports analog forms of video and audio. Accordingly, the A/V system interchanges an NTSC video signal and a digital-to-analog converted audio signal in the appropriate input/output format to support the operation of appliances.

However, with the rapid development of digital multimedia, the image resolution and the number of music channels increased significantly without affecting the functions of the TV, VCR and audio system. Thus, watching an image and listening to voice or music have been greatly enhanced by the development of the digital multimedia. Consequently, the methods for providing and implementing the images and audio for viewing and listening have also changed.

Figure 1:
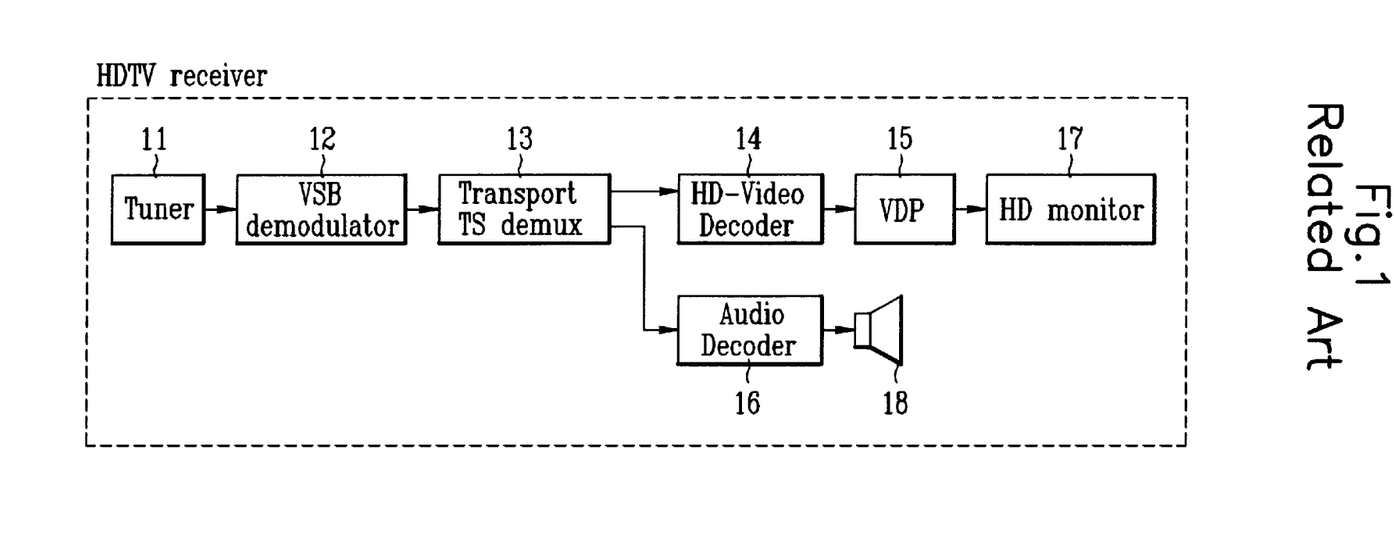
FIG. 1 is a block diagram of a HDTV receiver system in the related art.
Figure 2:
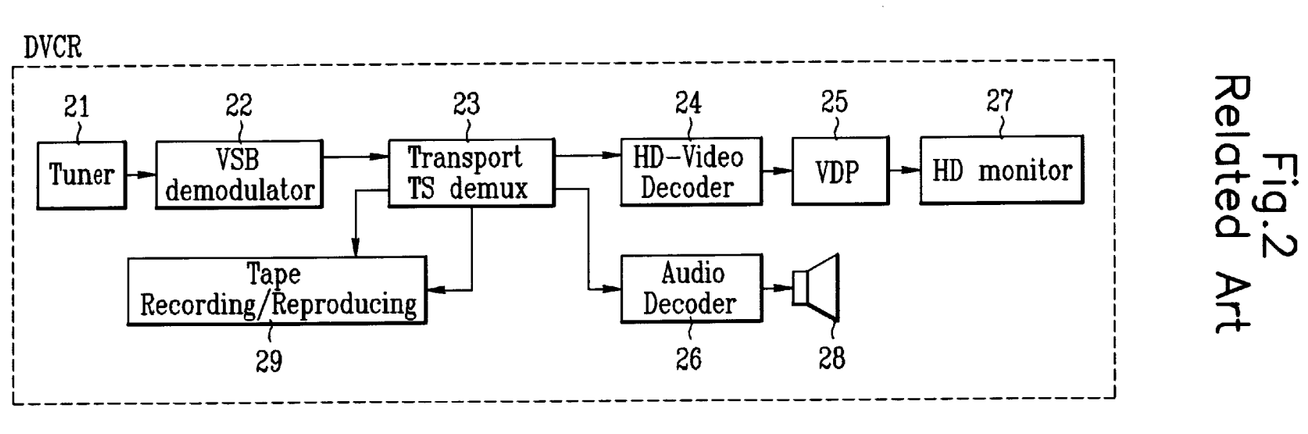
FIG. 2 is a block diagram of a DVCR system in the related art.
Figure 3:
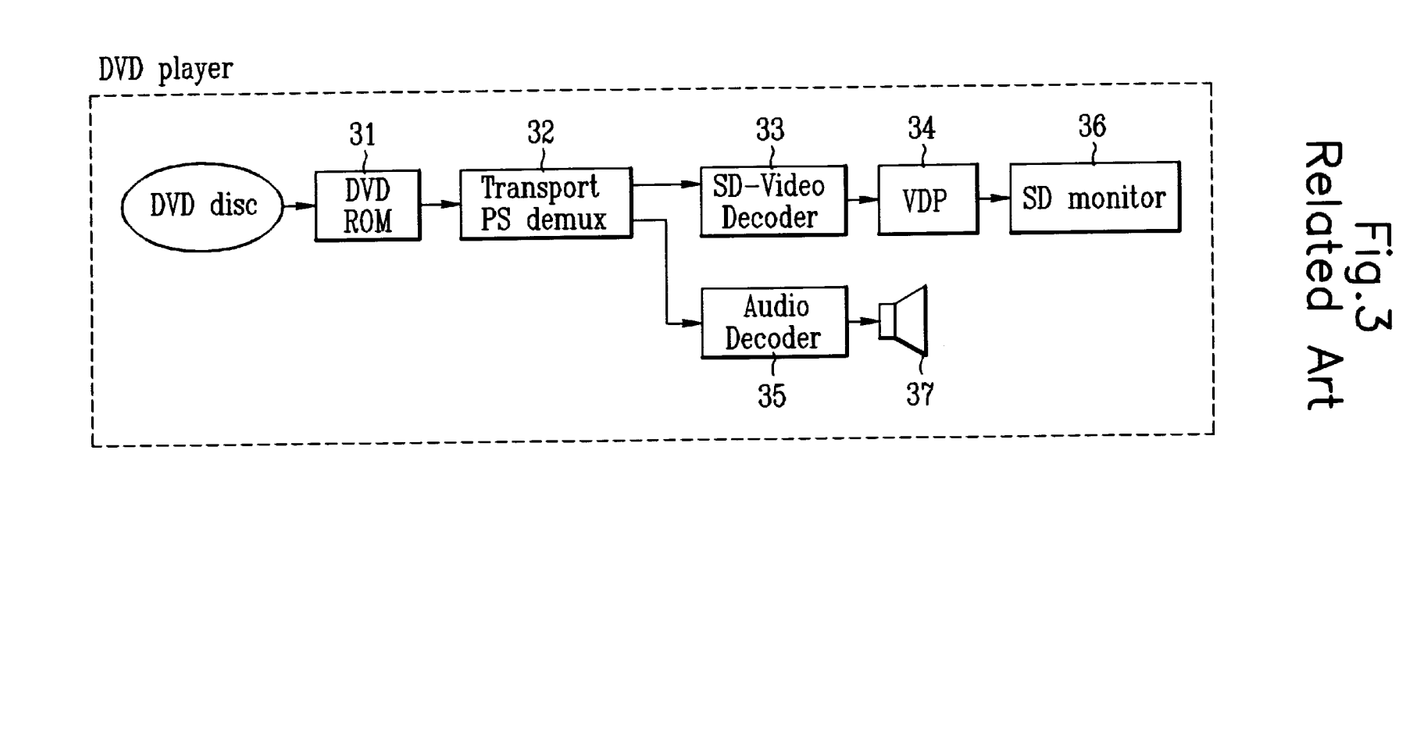
FIG. 3 is a block diagram of a DVD player system in the related art.

FIG. 1 is a block diagram of a High Definition TV (HDTV) receiver system in the related art; FIG. 2 is a block diagram of a DVCR system in the related art; and FIG. 3 is a block diagram of a DVD player system in the related art. Generally, in every system shown in the figures, the A/V signals are converted from analog to digital signals before processing in the respective systems and compression/expansion techniques are utilized for efficient storage and transmission of substantial amount of digital data. The HDTV receiver, DVCR and DVD player systems will next be described.

Referring to the HDTV in FIG. 1, a TV signal selected by a tuner 11 is forwarded to a Vestigial Sideband (VSB) demodulator 12. Because the TV signal is VSB modulated before transmission, the VSB demodulator 12 demodulates the TV signal to provide a transport stream of a program desired by a user. The transport stream obtained at the VSB demodulator 12 is separated into an audio stream and a video stream through a Transport TS demux (transport demultiplexer) 13, and decoded through an audio decoder 16 and a HD-video decoder 14 respectively. Upon completion of the decoding, the video stream is displayed on an HD monitor 17 through a Video Display Processor (VDP) 15 and the audio stream is played through a speaker 18.

Referring to the DVCR in FIG. 2, a VSB modulated signal is received through a tuner 21, is converted into a transport stream through a VSB demodulator 22 and is forwarded to a Transport TS demux 23. The obtained transport streams is recorded on a tape through a tape recording/reproducing unit 29 through the Transport TS demux 23. However, if a user wants to display the received signals while recording, the signals obtained at the Transport TS demux 23 are separated into a video and audio streams as in the HDTV, and output to a HD-video decoder 24 and an audio decoder 26 for display on a HD monitor 27 through a VDP 25 and speaker 28. To reproduce the signal recorded on the tape, the transport stream is read out from the tape at the tape recording/reproducing unit, separated at the Transport TS demux 23 into the audio and video streams, and output to the respective decoders 24 and 26, thereby facilitating the reproduction of the tape.

Referring to FIG. 3, a DVD disc is read using a DVD ROM 31, and a program stream read from the DVD ROM 31 is separated into a video stream, an audio stream and a sub picture at a Transport Program Stream (Transport PS) demux 32. The video stream and the sub picture are decoded by a SD-video decoder 33, and displayed on an SD monitor 36 through a VDP 34. Also, the audio stream is decoded through an audio decoder 35 and played through a speaker 37.

Unlike an analog system, the digital A/V system utilizes digital forms of input/output data streams defined by set standards. Namely, the input data form for the DTV and DVCR is the transport streams while the input data form for the DVD player is the program stream, as defined by the Motion Picture Expert Group (MPEG) standards (ISO/IEC 13818-1). The data streams are appropriately error correction coded and modulated for transmission and storage according to the transmission paths and storage media. Thus, the streams can be obtained by demodulating and error correction decoding at the respective system. Moreover, each stream contains the compressed video and audio streams as well as additional information such as a timing information for matching A/V synchronization.

Figure 4:
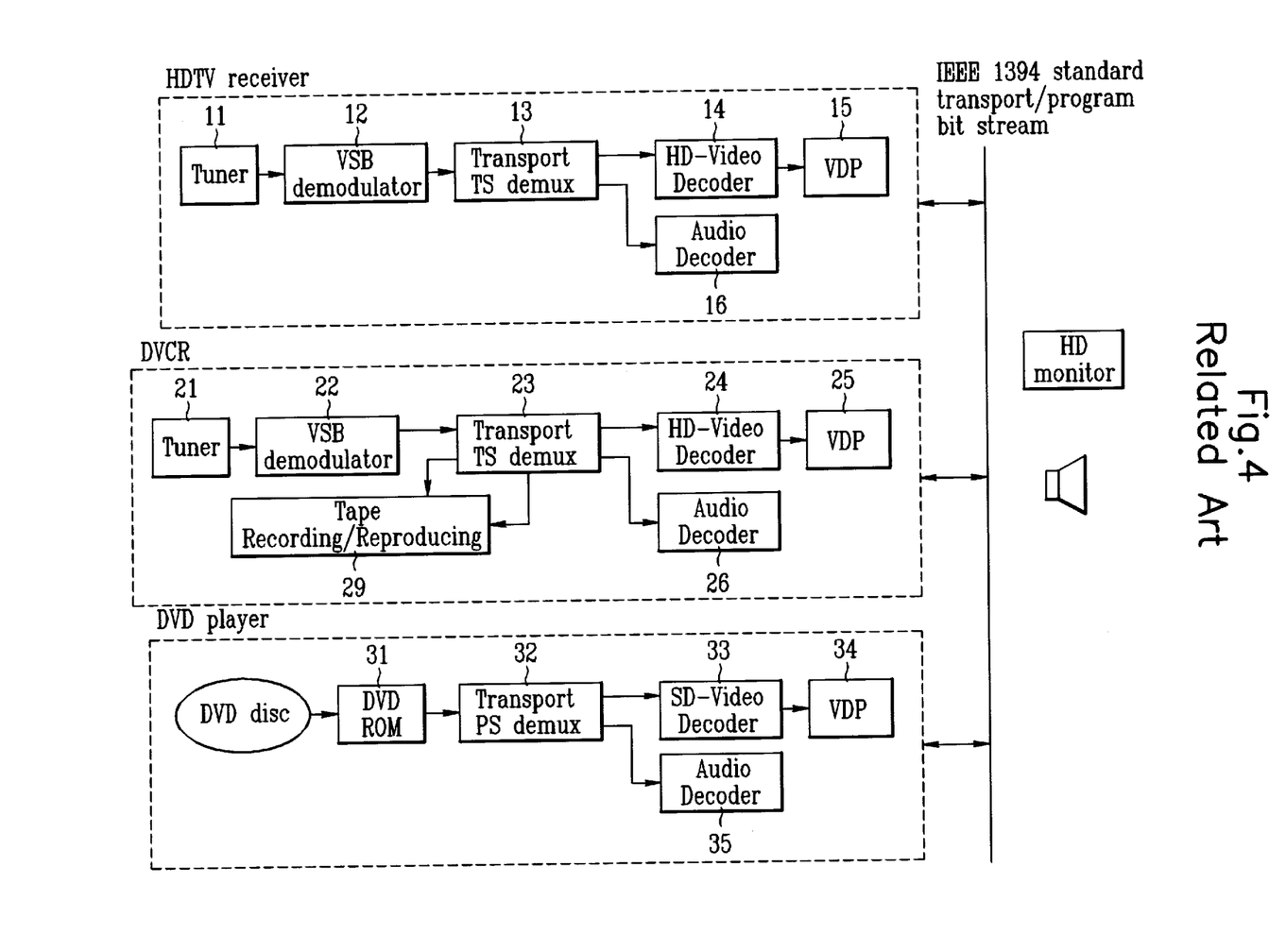
FIG. 4 is a block diagram of an A/V system integrating digital systems in the related art.

Although an analog system utilizes an NTSC composite video signal and two channels of digitized audio signals as input/output signals, the approach to an implementation of the digital A/V system would necessarily differ from the analog system because the digital system utilizes input/output streams defined by standards set by MPEG. FIG. 4 shows an A/V system in the related art which integrates the aforementioned digital systems of FIGS. 1–3, for facilitating the interchange of the aforementioned data streams. The integration shown in FIG. 4 is a simple combination of the digital systems with only a monitor and a speaker in common, using a set interface standard (IEEE 1394). The IEEE 1394 standard is for an effective connection of various domestic appliances, which also allows an interface of general digital A/V.

The IEEE 1394 standard works well for connecting various appliances. However, the combination according to the standard is complicated for interfacing digital A/V appliances, requiring many hardware. Moreover, the cost for implementing even the simple combination of FIG. 4 for interfacing the digital A/V appliances is substantially high.

SUMMARY OF THE INVENTION

Accordingly, an object of the present invention is to solve at least the problems and disadvantages of the related art.

An object of the present invention is to optimize the integration of a digital A/V system.

Another object of the present invention is to provide a simplified method for integrating a digital A/V system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the digital audio/video system includes a signal reception unit receiving signals; a processing unit processing the received signals and/or reading signals stored in a storage media; a transport demux processing the signals to standardize each received signal, to selectively decode the signals desired by a user, and to output a video stream and audio stream separately; a decoding unit decoding the video stream and the audio stream from the transport demux; an image display unit receiving and processing the signal processed by the decoding unit to display the signal according to a function requested by the user; an audio unit playing sound; a control signal application unit executing the function desired by the user; and a control unit detecting the control signals from the control signal application unit to overall control each of the units.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Figure 5:
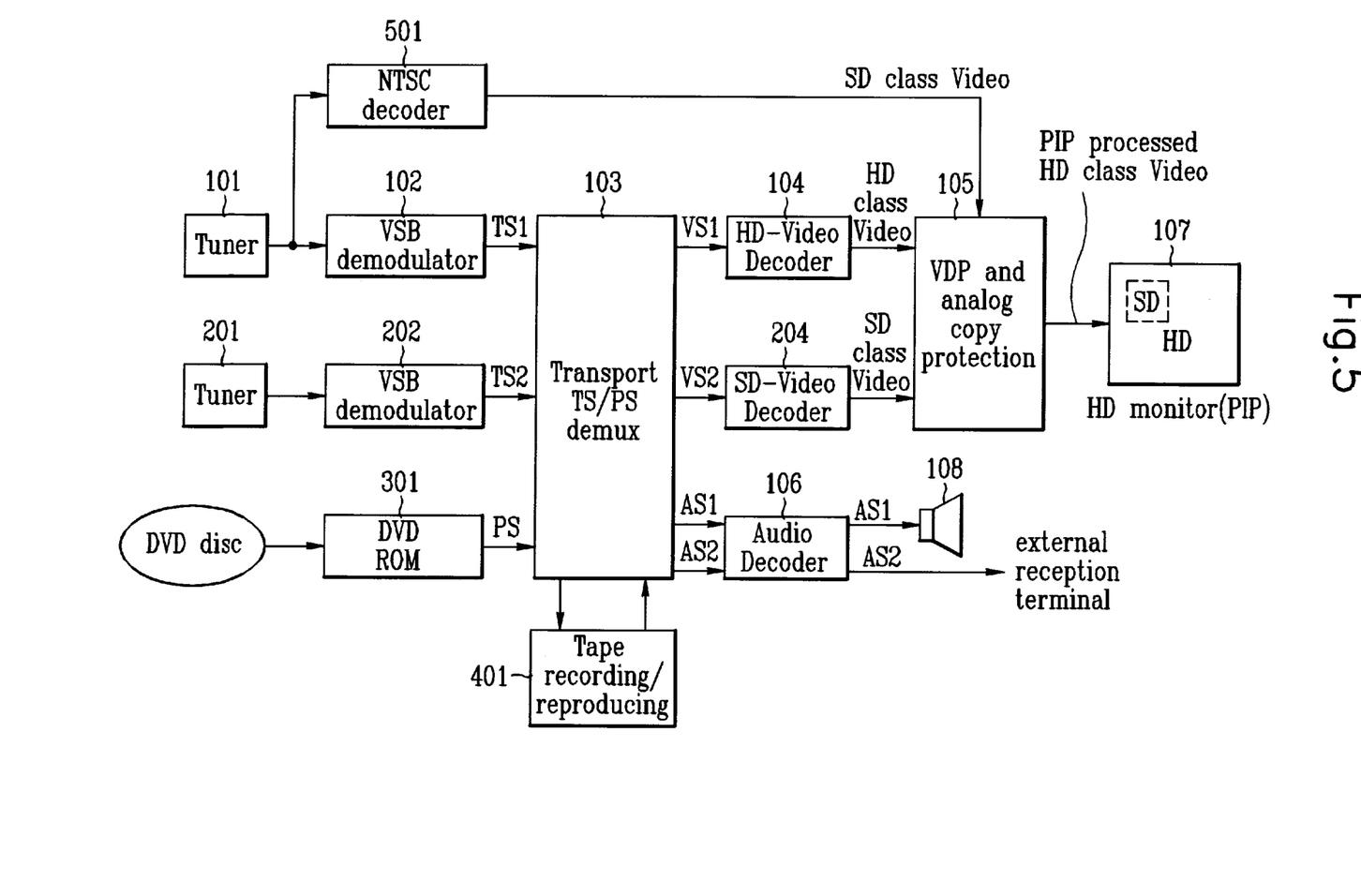
FIG. 5 is a block diagram of a digital A/V system according to the present invention.

Reference will now be made in detail to the preferred embodiments of the present invention, examples of which are illustrated in the accompanying drawings. FIG. 5 shows a block diagram of a digital A/V system according to the present invention. The digital A/V system integrates the functions of the DTV, DVCR and DVD.

The digital A/V system generally allows a user to simultaneously view two TV programs, to view one TV program and record the other TV program to simultaneously view two TV programs and record one program, to view one TV program and another program received from a storage device such as a video tape or a DVD disc, to view two programs received from a storage device, and other combinations of operations by a DTV, DVCR and DVD.

To provide the various combinations of operations, the digital A/V system generally includes a signal reception unit which receives and processes TV signals and signals from a storage unit such as a video tape or a DVD disc. A transport demultiplexer unit selects data streams output from the signal reception unit and outputs video streams and audio streams, based upon a function selected by a user. A display unit decodes the video streams from the transport demultiplexer unit into one of either a HD class image or a SD class image, and displays either the HD class image or both the HD class image and the SD class image on a display. Also, an audio unit decodes the audio streams from the transport demultiplexer unit and plays the decoded audio streams through an output terminal.

Particularly, the transport demultiplexer examines and deciphers the copy protection on to the input data streams; selects and outputs transport streams from the copy protected data streams or from a tape recording/reproducing unit, based upon a function selected by the user; and decodes and separates the selected transport streams into video streams and audio streams. The transport demultiplexer selects and outputs a first and second video streams and an audio stream based upon the function selected by the user.

Referring to FIG. 5, the digital A/V system according to the present invention comprises a DTV tuner 101 and a DVCR tuner 201, each selecting a TV signal; VSB demodulators 102 and 202 demodulating the selected TV signals from the tuners 101 and 201 to output transport streams TS1 and TS2; a DVD ROM 301 reading data stored in a DVD disc and outputting a program stream PS; a tape recording/reproducing unit 401 reproducing data recorded on a tape and recording a received signal on a tape; a transport TS/PS demux 103 selecting one of the signals from the VSB demodulator 102, the VSB demodulator 202, the tape recording/reproducing unit 401 and the DVD ROM 301 depending upon the function selected by the user and decoding the selected signal to separate the signal into video streams VS1 and VS2, and audio streams AS1 and AS2; a HD-video decoder 104 decoding the video stream VS1 from the transport TS/PS demux 103 into a HD class video signal; a SD-video decoder 204 decoding the video stream VS2 from the transport TS/PS demux 103 into a SD class video signal; a VDP and analog copy protection unit 105 processing the HD class and SD class video signals from the HD-video decoder 104 and SD video decoder 204 to display the signals on a HD monitor 107. The digital A/V system according to the present invention further includes an audio decoder 106 decoding the audio stream AS1 and AS2 from the transport TS/PS demux 103, and outputting an audio signal to a speaker 108.

The VDP and analog copy protection unit 105 also executes an analog copy protection to prevent improper copying of the decoded video signal on an existing analog VCR. Moreover, the VDP and copy protection unit 105 may have a Picture In Picture (PIP) function to selectively display a HD class image and a SD class image in a main frame and in a sub-frame when a user selects a function requiring two images to be displayed on the HD monitor 107.

Furthermore, the digital A/V system of the present invention may allow a display of an NTSC broadcasting signal in an SD class video on the HD monitor 107 by incorporating a NTSC decoder 501 to the digital A/V system. The NTSC decoder 501 decodes a general terrestrial TV signal (NTSC signal) and outputs a SD class video to the VDP and analog copy protection unit 105. The VDP and analog copy protection unit 105 would then process the HD class and SD class video signals from the HD-video decoder 104, SD video decoder 204 and NTSC decoder 501 to display the signals on a HD monitor 107.

Figure 6:
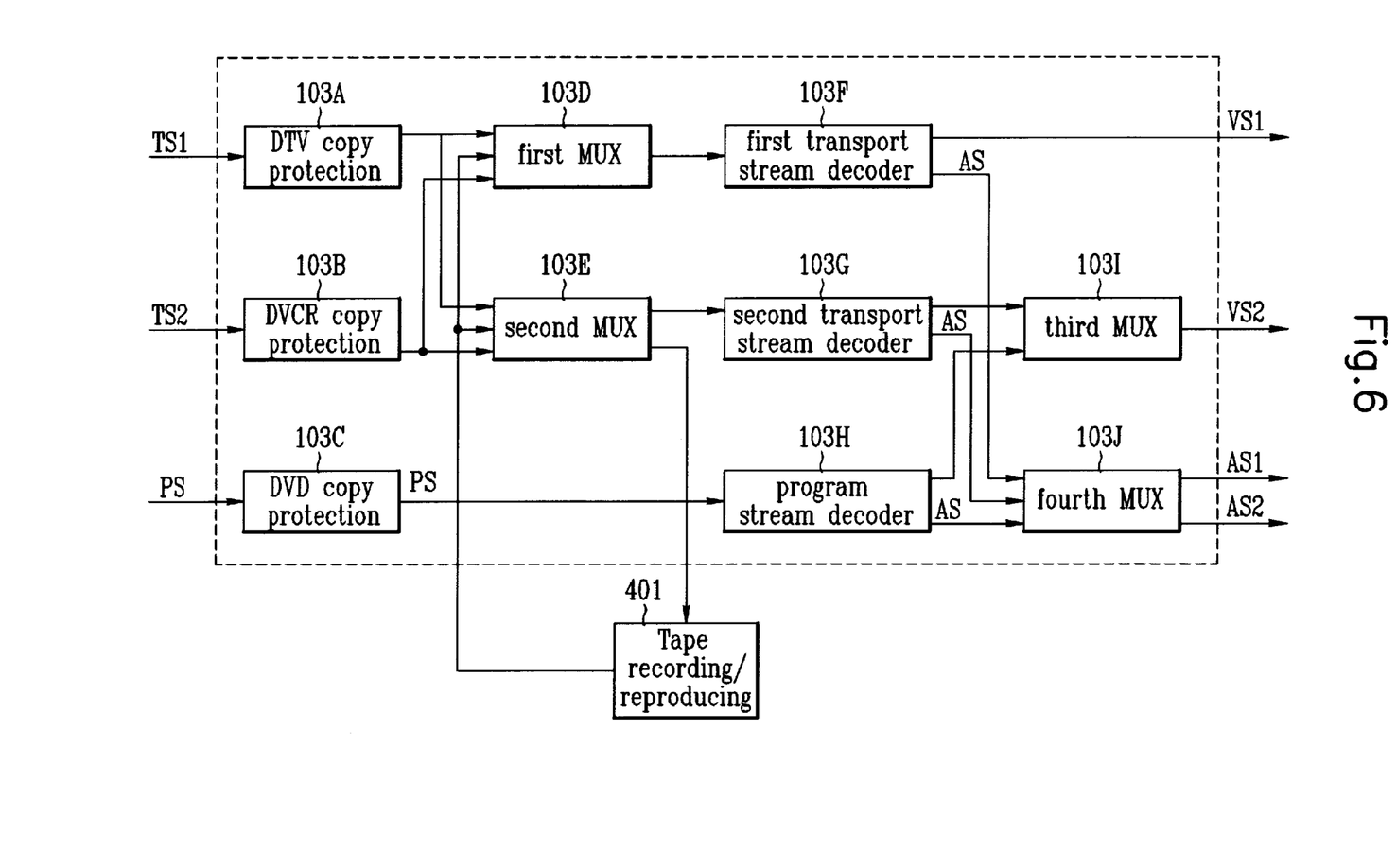
FIG. 6 is a block diagram of a transport TS/PS demux according to the present invention.

FIG. 6 is a block diagram of the transport TS/PS demux according to the present invention. Referring to FIG. 6, the transport TS/PS demux 103 includes a DTV copy protection unit 103A receiving a transport stream TS1, a demodulated DTV signal, from the VSB demodulator 102 to examine and decipher the digital copy protection on the transport stream; a DVCR copy protection unit 103B receiving a transport stream TS2, a demodulated DVCR signal, from the VSB demodulator 202 to examine and decipher the digital copy protection on the transport stream; a DVD copy protection unit 103C receiving a program stream PS from the DVD ROM 301 to examine and decipher the digital copy protection on the program stream.

The transport TS/PS demux 103 also includes a first MUX 103D selectively receiving a signal from the DTV copy protection unit 103A and the DVCR copy protection unit 103B or from the tape recording/reproducing unit 401 to present the received signal as HD class video according to a function required by the user; a second MUX 103E selectively receiving a signal from the DTV copy protection unit 103A and the DVCR copy protection unit 103B or from the tape recording/reproducing unit 401 to present the received signal as SD class video according to a function required by the user; a first transport stream decoder 103F decoding and separating the output from the first MUX 103D into the video stream VS1 and an audio stream AS; a second transport stream decoder 103G decoding and separating the output from the second MUX 103E into a video stream and an audio stream AS; a program stream decoder 103H decoding and separating the program stream from the DVD copy protection unit 103C into a video stream and an audio stream AS; a third MUX 103I selectively forwarding video streams VS2 from either the second transport stream decoder 103 G or the program stream decoder 103H according to a user's request; and a fourth MUX 103J selectively forwarding audio streams AS1 and AS2 from the first transport stream decoder 103F, the second transport stream decoder 103G and the program stream decoder 103H according to a user's request.

The operation of the digital A/V system will be explained with reference to FIGS. 5 and 6. The digital A/V system receives signals through the DTV tuner 101, the DVCR tuner 201, the DVD ROM 301 and the tape recording/reproducing unit 401, and processes the received signal to select signal(s) required for the function requested by a user. Particularly, the TV signals received from the tuners 101 and 201 are converted into transport streams TS1 and TS2 at the VSB demodulators 102 and 202 respectively, and are output to the transport TS/PS demux 103. Data is read from the DVD disc and converted into a program stream PS at the DVD ROM 301 to be output to the transport TS/PS demux 103. Moreover, a signal is reproduced and converted into transport stream at the tape recording/reproducing unit 401 and is also output to the transport TS/PS demux 103.

The transport TS/PS demux 103 decodes signals necessary for the functions requested by the user from among the DTV transport stream TS1, DVCR transport stream TS2 and DVD program stream PS. The transport TS/PS demux 103 also separates the decoded signals into video streams VS1 and VS2, and audio streams AS1 and AS2. The separated data streams are selectively output the decoders 104, 204 and 106. Particularly, the copy protection units 103A–C examine and decipher the copy protection on the transport streams TS1 and TS2 and the program stream PS, provided in a digital signal for protection against an improper copying.

Upon deciphering the copy protection, the transport streams from the DTV and DVCR copy protection units 103A and 103B are output to both the first MUX 103D and the second MUX 103E. Because the program stream from the DVD ROM 301 is displayed as an SD class image, the signal from the DVD copy protection unit 103C is directly output to the program stream decoder 103H according to DVD standards. The first and second MUX 103D, 103E select the appropriate transport streams based upon the user's requests received through an input interface such as a remote control.

The transport streams selected at the first and second MUX 103D, 103E are output to the first and second transport stream decoders 103F and 103G. The transport streams are decoded and separated into video streams and audio streams at the first and second transport stream decoders 103F and 103G. If the function for playing a tape is selected, the first or second MUX 103D or 103E selects the transport stream from the tape recording/reproducing unit 401. If the function for recording on the tape is selected, the transport stream from the second MUX 103E is output to the tape recording/reproducing unit 401. The program stream from the DVD copy protection unit 103C is output to the program stream decoder 103H and is also separated into a video stream and an audio stream AS.

The video streams and the audio streams AS from the decoders 103F-H are output to the appropriate block based upon the selected functions. Particularly, the video stream VS1 from the first transport stream decoder 103F is directly output to the HD-video decoder 104 because the video stream VS1 is a video stream for displaying an HD class image. However, both the video streams from the second transport stream decoder 103G and program stream decoder 103H are output to the third MUX 103I. The third MUX 103I selects one of the signals according to the function selected by the user and the selected signal is output as video stream VS2 to the SD-video decoder 204. The audio streams AS from the first and second transport stream decoders 103F and 103G and from the program stream decoder 103H are forwarded to the fourth MUX 103J. The fourth MUX 103J selects and output audio stream signals as AS1 and AS2 according to the function selected by the user.

The HD-video decoder 104 and the SD-video decoder 204 receive and decode the video streams VS1 and VS2 to output a HD class video signal and a SD class video signal, respectively. Both the HD-video decoder 104 and SD-video decoder 204 are adapted to decode video streams of MPEG2 standards and incorporates a Variable Length Code (VLC) unit, an Inverse Discrete Cosine Transform (IDCT) unit and a motion compensation unit to decode a compressed video stream. Accordingly, the HD-video decoder 104 and SD-video decoder 204 outputs the decoded data in frame or field units to the VDP and analog copy protection 105. Having a down conversion capability by which a HD class video bit stream can be reduced to a SD class video bit stream, the SD-video decoder 204 can receive and decode the HD class video stream into the SD class video stream. Also, the audio streams AS are decoded at the audio decoder 106 and output to the speaker 108 or to an external reception terminal such as earphone, headphone, and other external devices.

The VDP and analog copy protection 105 converts the format of the decoded frame or field to a format necessary for the HD monitor 107. Namely, the VDP and analog copy protection 105 sets the analog copy protection in the video signal presented to the HD monitor 107 to prevent the decoded video signal from being improperly copied to an existing analog VCR. The NTSC decoder 501 may be additionally included to decode a general terrestrial broadcasting signal from the signal selected at the tuner 101 and to display an SD class video signal on the HD monitor 107 through the VDP and analog copy protection 105.

Examples of the application of the digital A/V system of the present invention will next be explained. If a user selects a DTV channel, the selected DTV channel may include one or several programs. If the selected channel carries only one program, a transport stream TS1 of the program desired by the user is obtained through the tuner 101 and the VSB modulator 102. The obtained transport stream TS1 is separated into the video stream VS1 and the audio stream AS1 as the stream passes through the transport TS/PS demux 103.

The video stream VS1 is decoded by the HD-video decoder 104 and is output as an HD class video signal to the VDP and analog copy protection unit 105. Thus, the video stream VS1 is displayed on the HD monitor 107 as an HD image.

If the selected channel carries more than one program, a transport stream TS1 is obtained through the tuner 101 and the VSB demodulator 102 as above, and is separated into individual programs through the transport TS/PS demux 103. Namely, the transport stream TS1 for two programs are output separately to the first and second MUX 103D, 103E respectively through the DTV copy protection 103A. Thereafter, the transport streams for one program is displayed on the HD monitor 105 through the first transport stream decoder 103F and through the HD-video decoder 104, while the second program may be displayed on the HD monitor 105 through the second transport stream decoders 103G and through the SD-video decoder 204.

If the user selects a PIP window to view two programs on the HD monitor 107, the VDP and analog copy protection 105 displays the received programs on the main window and a PIP window of the HD monitor 107 by classifying the video stream as a main frame video and a sub frame video. However, if one program is to be displayed on the HD monitor 107 while the other program is to be recorded, one program is displayed on the HD monitor 107 through the VDP and analog copy protection 105 and the other program is output from the second MUX 103E to the tape recording/reproducing unit 401. The program to be recorded may also be viewed by outputting the program to the second MUX 103E and displaying the program through the second transport stream decoders 103G and through the SD-video decoder 204.

Particularly, when the user selects a recording on a DVCR, a transport stream of the program the user wishes to record is output through the tuner 201 and VSB demodulator 202 to the transport TS/PS demux as transport stream TS2. Thereafter, the transport stream TS2 is output and stored in the tape recording/reproducing unit 401 through the second MUX 103E. If the user wishes to view the program while the program is being recorded, the transport stream TS2 is separated into a video stream VS1 and an audio stream AS1 through the first MUX 103D and through the first transport stream decoder 103F to be displayed on the HD monitor 107.

If the user wishes to reproduce from the DVCR, a transport stream read from a tape in the tape recording/reproducing unit 401 is output to the first MUX 103D or the second MUX 103E to be processed. Generally, the reproduced transport stream is displayed as a HD class video and is passed through the first MUX 103D and the HD video decoder 104 for display as the HD class image on the HD monitor 107.

When the user wishes to reproduce from a DVD, a program stream on the DVD disc is received through the DVD ROM 301 and is separated into a video stream VS2 and audio stream to AS at the transport TS/PS demux 103. The video stream VS2 is output to the SD video decoder 204 through the third MUX 103I, is decoded at the SD video decoder 204, and is displayed on the HD monitor 107 as an SD class image. The audio stream AS is played by the speaker 108 through the audio decoder 106.

If the user wishes to record a different channel on the DVCR while viewing a program on the DTV, a transport stream TS1 for the DTV channel reception is received through the tuner 101 and the VSB demodulator 102, while a transport stream TS2 for the DVCR recording is received through the tuner 201 and the VSB demodulator 202. Thereafter, the transport streams TS1 and TS2 are displayed on the HD monitor 107 and recorded at the tape recording/reproducing unit 401, respectively, by the same process mentioned above. Also, if the user does not with to view the program being recorded, the recording is made by the tape recording/reproducing unit 401. However, if the user wishes to view the program being recorded, the video stream VS2 being recorded is forwarded to the third MUX 103I, is decoded at the SD video decoder 204, and is PIP processed at the VDP and analog copy protection 105. Thus, the PIP processed video stream VS2 is displayed by a sub frame as an SD class image on the HD monitor 107 while the DTV image is displayed by a main frame as an HD class image.

If the user wishes to view the DVCR image as an HD class image and the DTV image as an SD class image, the inputs to the HD video decoder 104 and SC video decoder 204 are exchanged by exchanging the outputs from the first MUX 103D and the second MUX 103E. Namely, the transport stream TS1 is output as VS2 through the second MUX 103E and the first transport stream decoder, and the transport stream TS2 is output as VS1 through the first MUX 103D and the second transport stream decoder 103G. This interchange is made possible because the SD video decoder 204 has the capability to down convert an HD class video bit stream into an SD class video stream during the decoding of the video bit stream.

To reproduce data from the DVCR while a signal for the DTV is being received, the transport stream TS1 for the DTV reception is received through the tuner 101 and the VSB demodulator 102, and the transport stream for the DVCR reproduction is received from the tape recording/reproducing unit 401. Afterwards, the transport TS/PS demux 103 appropriately outputs the transport stream TS1 and transport stream for the reproduction from the first MUX 103D and the second MUX 103E depending on which of the transport stream is to be displayed as the HD class image.

To reproduce data from the DVD while a signal for the DTV is being received, the transport stream TS1 for the DTV reception is received through the tuner 101 and the VSB demodulator 102, is output by the first MUX 103D to be decoded by the HD video decoder 104, and is displayed on the HD monitor as an HD class image. The program stream PS for the DVD reproduction is received by reading the DVD disc through the DVD ROM 301, and the program stream PS is displayed as an SD class image through the SD video decoder 204.

To reproduce data from the DVD while a signal is being recorded at the DVCR, the transport stream TS2 for the DVCR recording is received through the tuner 201 and the VSB demodulator 202, and is recorded at the tape recording/reproducing unit 401 through the second MUX 103E. The program stream PS is received from the DVD ROM 301 and is displayed as an SD class image through the SD video decoder 204. If the user wishes to view the image being recorded, a main frame and a sub frame are set with respect to the PIP window on the HD monitor 107 and images of the DVCR and DVD are displayed according to the user selection following the process described above, wherein the DVCR image being recorded is displayed as an HD class since DVD standards only allows an SD class image display.

Accordingly, the digital A/V system allows many combinations of operations, some of which have been explained above. Other operations may include listening to two different audio using different devices, such as a speaker and headphone when more than one audio signals are generated due to the PIP function in which one audio signal is forwarded to one output terminal such as a headphone while the other audio is played through another output terminal such as the speaker 108.

Moreover, because the digital A/V system of the present invention eliminates the necessary for duplicated devices for different operations, the design of the digital A/V system is simplified allowing an efficient digital A/V system that can realize various functions.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A digital audio/video system comprising:
   a signal reception unit receiving and processing TV signals and signals from a storage unit, said signal reception unit outputting data streams;
   a transport demux unit selecting data streams from the signal reception unit and outputting video streams and audio streams, based upon a function selected by a user;
   a display unit decoding the video streams from the transport demux unit into one of either a HD class image or a SD class image, and displaying either the HD class image or both the HD class image and the SD class image on a display; and
   an audio unit decoding the audio streams from the transport demux unit and playing the decoded audio streams through an output terminal.

2. A system of claim 1, wherein the signal reception unit comprises:
   a DTV signal reception unit receiving and processing first TV signals to output a first transport stream;
   a DVCR signal reception unit receiving and processing second TV signals to output a second transport stream;
   a DVD signal reception unit receiving and processing signals from a first storage unit to output program stream; and
   a tape recording/reproducing unit receiving and processing signals from a second storage unit to output a third transport stream.

3. A system of claim 2, wherein the transport demux unit comprises:
   a DTV copy protection unit examining and deciphering the copy protection on the first transport stream;
   a DVCR copy protection unit examining and diciphering the copy protection on the second transport stream;
   a DVD copy protection unit examining and diciphering the copy protection on the program streams;
   a first MUX selecting and outputting a transport stream from one of the DTV copy protection unit, the DVCR copy protection unit or the tape recording/reproducing unit based upon the function selected by the user;
   a second MUX selecting and outputting a transport stream from one of the DTV copy protection unit, the DVCR copy protection unit or the tape recording/reproducing unit based upon the function selected by the user;
   a first transport stream decoder decoding and separating the selected transport stream from the first MUX into a first video stream and an audio stream;
   a second transport stream decoder decoding and separating the selected transport stream from the second MUX into a video stream and an audio stream;
   a program stream decoder decoding and separating the program stream from the DVD copy protection unit into a video stream and an audio stream;
   a third MUX selecting and outputting a video stream from one of either the second transport stream decoder or the program decoder as a second video stream, based upon the function selected by the user; and
   a fourth MUX selecting and outputting an audio stream from one of the first transport decoder, the second transport decoder, or the program stream decoder, based upon the function selected by the user.

4. A system of claim 3, wherein the second MUX selects and outputs a transport stream from one of the DTV copy protection unit or the DVCR copy protection unit to the tape recording/reproducing unit based upon the function selected by the user; and wherein the tape recording/reproducing unit records the transport stream from the second MUX on a storage.

5. A system of claim 3, wherein the display unit comprises:
   a HD-video decoder decoding the first video stream from the first transport stream decoder and outputting the HD class image;
   a SD-video decoder decoding the second video stream from the third MUX and outputting the SD class image; and
   a VDP and analog copy protection unit converting the format of the HD class image and the SD class image received from the HD-video decoder and the SD-video decoder into a format used by the display.

6. A system of claim 5, wherein the HD-video decoder and the SD-video decoder are adapted to decode video streams of MPEG2 standards.

7. A system of claim 5, wherein the SD-video decoder receives and converts a HD class video stream to the SD class image, depending on the function selected by the user.

8. A system of claim 5, wherein the display is a HD monitor with a PIP window.

9. A system of claim 5, wherein the signal reception unit further comprises a NTSC decoder receiving and processing a general terrestrial TV signal, said NTSC decoder outputting a SD class image to the VDP and analog protection unit depending on the function selected by the user; and wherein the VDP and analog copy protection unit converts the format of the SD class image received from one of the SD-video decoder or the NTSC decoder into a format used by the display.

10. A system of claim 3, wherein the audio unit comprises an audio decoder decoding and outputting the audio stream from the fourth MUX; and wherein the output terminal is one of a earphone, a headphone, or a speaker.

11. A system of claim 1, wherein the transport demux comprises:
   a copy protection unit examining and deciphering the copy protection on the data streams from the signal reception unit;
   a first multiplexing unit selecting and outputting transport streams from the copy protection unit or the tape recording/reproducing unit, based upon the function selected by the user;
   a transport stream decoding unit decoding and separating the selected transport streams from the first multiplexing unit into video streams and audio streams, said transport stream decoding unit outputting one video stream as a first video stream;

a program stream decoding unit decoding and separating a program stream from the copy protection unit into a video stream and an audio stream;

a second multiplexing unit selecting and outputting a second video stream from either the transport stream decoding unit or from the program stream decoding unit, said second multiplexing unit outputting one of the audio streams from either the transport stream decoding unit or the program stream decoding unit.

12. A method for integrating a digital audio/video system comprising:

(a) receiving and processing TV signals and signals from a storage unit, and outputting data streams;

(b) outputting video streams and audio streams from the data streams, based upon a function selected by a user;

(c) decoding the video streams into one of either a HD class image or a SD class image, and displaying either the HD class image or both the HD class image and the SD class image on a display; and (d) decoding the audio streams and playing the decoded audio streams through an output terminal.

13. A method of claim 12, wherein step (a) comprises:

receiving and processing first signals to output a first transport stream;

receiving and processing second TV signals to output a second transport stream;

receiving and processing signals from a tape recording/reproducing unit to output a third transport stream; and receiving and processing signals from a first storage unit to output a program stream.

14. A system of claim 13, wherein step (b) comprises:

examining and deciphering the copy protection on the first transport stream;

examining and deciphering the copy protection on the second transport stream;

examining and deciphering the copy protection on the program streams;

selecting and outputting transport streams from one of the first transport stream, the second transport stream or the third transport stream, based upon the function selected by the user;

decoding and separating a first selected transport stream into a first video stream and an audio stream;

decoding and separating a second selected transport stream into a video stream and an audio stream;

decoding and separating the program stream into a video stream and an audio stream;

selecting and outputting a video stream from one of either the second selected transport stream or the program stream as a second video stream, based upon the function selected by the user; and selecting and outputting an audio stream from one of the first selected transport stream, the second selected transport stream, or the program stream, based upon the function selected by the user.

15. A system of claim 14, wherein step (b) further comprises:

selecting and outputting a transport stream from one of the first transport stream or the second transport stream to the tape recording/reproducing unit based upon the function selected by the user; and recording the selected transport stream on a storage in the tape recording/reproducing unit.

16. A system of claim 12, wherein step (b) comprises:

examining and deciphering the copy protection on the data streams;

selecting and outputting transport streams from the copy protected data streams or from a tape recording/reproducing unit, based upon the function selected by the user;

decoding and separating the selected transport streams video streams and audio streams, and outputting one video stream as a first video stream;

decoding and separating a program stream from the copy protected data stream into a video stream and an audio stream;

selecting and outputting a second video stream from either the selected transport streams or from the program stream, and outputting one of the audio streams from either the selected transport stream or the program stream.

* * * * *